Sept. 6, 1932.  M. J. WEAVER  1,875,533
TREE PROTECTOR
Filed July 9, 1931

INVENTOR
Milo J. Weaver
BY
Evans & McCoy
ATTORNEYS

Patented Sept. 6, 1932

1,875,533

UNITED STATES PATENT OFFICE

MILO J. WEAVER, OF BERLIN HEIGHTS, OHIO

TREE PROTECTOR

Application filed July 9, 1931. Serial No. 549,649.

This invention relates to the protection of fruit trees, and more particularly to a method of and means for protecting fruit trees adjacent the base thereof from attack and deterioration by animals, fire and other causes.

Fruit trees, and sometimes entire orchards are destroyed by deterioration of the trunks of the trees adjacent to the ground. Such destruction occurs principally from two sources, namely, removal of the bark by rodents, such as rabbits, field mice, and other small animals, and burning of the bark by grass fires. Removal of the bark, particularly of young trees, by rodents may occur at all seasons of the year, but occurs especially in the cold seasons when food is scarce. Grass fires occur frequently, particularly in hot dry weather, the flames attacking the trees near the base thereof. In both cases the result is the serious deterioration or killing of the trees. In certain instances, the losses from these sources have been enormous.

An object of my invention is to provide a method of protecting fruit trees at their base from attack by rodents and other small animals, and from fire and like causes, while yet permitting free access of air and moisture to the base of such trees for the unimpaired growth thereof.

Another object is to provide a simple and economical method of and means for protecting fruit trees, such means being capable of withstanding summer and winter temperatures without material deterioration.

Another object is to provide means to surround fruit trees at their base to prevent animals, fire and the like from injuring the bark and substance of such trees while yet not inhibiting the growth or adversely affecting the health thereof.

Other objects of the invention will be apparent to those skilled in the art from the disclosures herein made.

By my invention I encircle the base of the fruit tree to be protected with a collar arranged to rest on the ground and of such shape and dimensions as to prevent rodents from access to the bark of the tree at the base thereof. The collar is spaced from the surface of the tree and is so constituted as to permit access of air, moisture and sunshine to the base of the tree while at the same time preventing formation of mold or mildew on the portion of the tree within the collar. The collar is of material of great durability and is composed of sections of such size and shape as to permit ready shipment and easy assembly thereof. Further features of the invention will appear as the description thereof progresses.

In the drawing which illustrates a specific embodiment of this invention,

Figure 1:
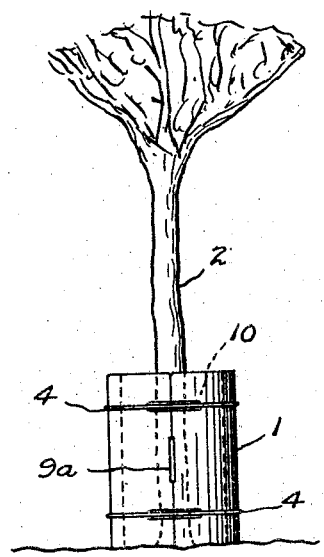
Figure 1 is an elevational view showing the assembled collar in position around the base of a fruit tree.
Figure 2:
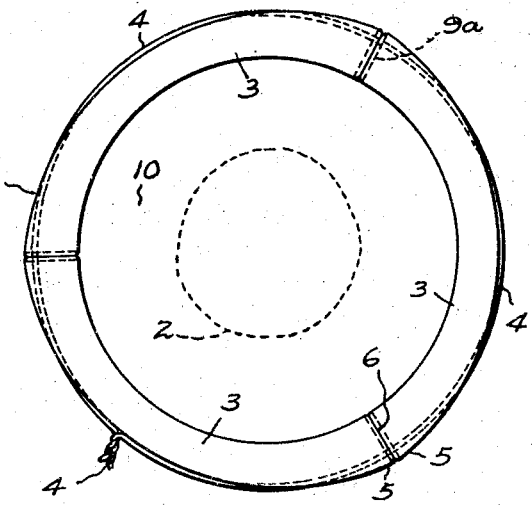
Fig. 2 is a top plan view of the assembled collar.
Figure 3:
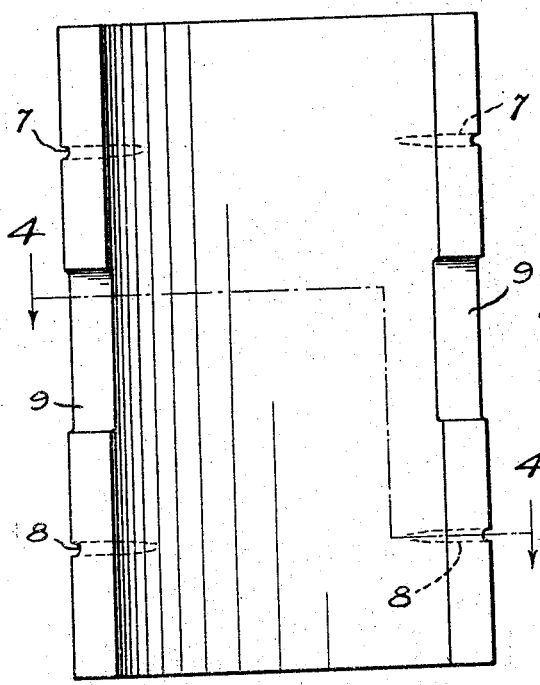
Fig. 3 is a vertical elevation of one section of the collar looking toward the interior thereof.
Figure 4:
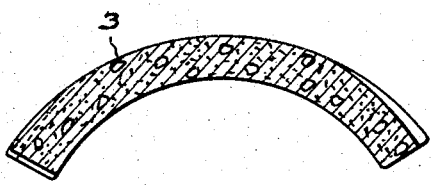
Fig. 4 is a horizontal section taken on line 4—4 of Fig. 3.

In the drawing I have shown a sectional cylindrical protector 1. The protector 1 is shown as resting on the surface of the ground and as surrounding the base of the fruit tree 2 in spaced relation thereto. The annular collar or protector 1 is shown as comprising three longitudinal solid sections 3 of identical size and shape, the section 3 being secured in assembled relation by wires 4, or equivalent assembly means.

The sections 3 as shown are made of waterproof concrete and are shown as thicker in section at 5 adjacent the longitudinal edges 6 thereof to impart increased strength to the completed structure. In the specific form of my invention illustrated in the drawing the increased thickness of section at 5 is accomplished by increasing the radius of curvature, or in other words, decreasing the curvature of the other surface adjacent the longitudinal edges 6. In the assembled protector 1, therefore, the interior of the protector is shown as circular in section and the exterior is somewhat flattened adjacent the longitudinal meeting edges 6.

To hold the sections 3 more readily and more securely in assembled position, I have provided the grooves 7 and 8 adjacent the longitudinal edges of the sections. These grooves 7 and 8, as shown, are of greatest depth at the longitudinal edges 6 and gradually fade out toward the central portion of each section 3. The grooves 7 and 8 are of such depth as to provide, together with the central exterior portions of the sections, a circular path for the assembly wires 4 whereby such wires may contact with the sections substantially throughout the entire periphery of the protector 1. The width of the grooves 7 and 8 preferably is such as to accommodate snugly the assembly medium employed and may be varied to accommodate the dimensions of the particular assembly members employed. The longitudinal edges of each section are shown as cut away at 9 adjacent the central portion of the edges 6 to provide in the assembled protector the longitudinal slots 9ª which are large enough to permit active circulation of air into and out of the annular space 10 between the protector 1 and tree 2, but not large enough to permit rodents such as rabbits, field mice, etc. to gain access to the tree.

My protector may be of widely varying dimension according to the particular circumstances. By way of example and illustration, however, I have found that a protector of approximately ten inches internal diameter and sixteen to eighteen inches height to be very satisfactory for use with apple trees up to fifteen years of age. For any given case the internal diameter of the protector should be sufficient to provide ample air space around the tree and the height of the protector should be sufficient to prevent rodents and like animals from gaining access to the surface of the tree. The thickness of the protector sections 3 is such as to provide adequate mechanical strength, and referring to the above specific example, sections of approximately one inch in thickness at the central portion have been found to be very satisfactory.

While the protectors 1 may be made in any suitable number of longitudinal sections of equal or unequal dimension, I have found it preferable to make the protector in three equal sections, whereby a single mold may be employed and whereby such sections may be readily and compactly packed for shipment or storage.

While my improved protector may be made of any suitable material, metallic or non-metallic, I have found the use of concrete, particularly water-proof concrete, to be advantageous and preferable. Thus, water-proof concrete retains its shape and does not crumble upon long exposure to the atmosphere and is exceedingly durable and non-fragil. Furthermore, a protector of concrete does not draw moisture from the tree or otherwise tend to dry up the tree. The concrete protector, moreover, may if desired, be reinforced by metallic wires, screening, or other suitable means.

While ventilation apertures might be provided through the protector at any suitable place therein, the provision of the slots 9ª at the meeting edges of the sections is highly advantageous in that they may be readily formed, do not appreciably weaken the structure, and permit a large amount of ventilation for a given size of slot, and further permit the removal of excess heat and prevent the formation of mold or mildew on the bark of the tree.

While I have illustrated my protector as substantially circular in section it will be obvious that the protector may be of any suitable shape for encompassing a tree. Thus, the protector might be of polygonal, elliptical, or any other regular or irregular shape.

It will be noted that my improved sectional fruit tree protector is sufficiently flexible in construction to withstand the wide variation between summer and winter temperatures, and to withstand the compressive or expansive pressure of ice without destruction.

It will further be noted that the strengthening of the protector sections along their longitudinal edges may be accomplished by decreasing the outer radius of curvatures, as shown in the drawing, by increasing the inner radius adjacent the longitudinal edges, or in any other suitable or equivalent manner.

It will further be seen that by my invention fruit trees are protected at their bases from attack and deterioration by rodents and other animals and from grass fires such as frequently occur in orchards, while yet access of air, moisture and sunshine is permitted. Furthermore, by permitting the protector to rest on the ground at or near the surface thereof, delicate roots of young trees lying close to the surface are not injured.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A fruit protector comprising, in combination, a concrete collar arranged to rest upon the ground and to surround the base of a tree in spaced relation thereto, said collar extending from the ground upwardly to a height to prevent scaling thereof by rodents, said collar comprising a plurality of longitudinal sections, said sections being of greater thickness along their longitudinal edges to strengthen said sections, and means holding said sections in assembled relation.

2. A fruit protector comprising, in combination, a concrete collar arranged to rest upon the ground and to surround the base of a tree in spaced relation thereto, said collar extending from the ground upwardly to a height to prevent scaling thereof by rodents, said collar comprising a plurality of longitudinal sections which abut edge to edge and which are thickened along their abutting edges, and spaced bands holding said sections in assembled relation, the thickened portions of said sections having grooves to receive said bands.

3. A fruit protector comprising, in combination, a concrete collar arranged to rest upon the ground and to surround the base of a tree in spaced relation thereto, said collar extending from the ground upwardly to a height to prevent scaling thereof by rodents, said collar comprising three substantially identical sections of substantially 120 degrees circumferential extent, the outer side of the portions of each said section adjacent the longitudinal edges thereof being of substantially greater radius of curvature to thicken said sections adjacent said longitudinal edges, said sections being grooved at said thickened sections to provide true circular paths around the entire collar, and binding means in said grooves surrounding said collar to contact with substantially the entire periphery of said collar and hold the collar sections in assembled relation.

4. A fruit protector comprising, in combination, a concrete collar arranged to rest upon the ground and to surround the base of a tree in spaced relation thereto, said collar extending from the ground upwardly to a height to prevent sealing thereof by rodents, said collar comprising a plurality of longitudinal sections, said sections having shallow recesses in their longitudinal meeting edges intermediate the top and bottom of the collar to provide elongated slots sufficiently large to permit ready access of air but narrow enough to exclude rodents, and means holding said sections in assembled relation.

In testimony whereof I affix my signature.

MILO J. WEAVER.